United States Patent
Park

(10) Patent No.: US 8,585,553 B2
(45) Date of Patent: Nov. 19, 2013

(54) METHOD FOR REDUCING BACKLASH VIBRATIONS IN HYBRID ELECTRIC VEHICLE

(75) Inventor: Joon Young Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 1042 days.

(21) Appl. No.: 12/617,239

(22) Filed: Nov. 12, 2009

(65) Prior Publication Data

US 2011/0028269 A1 Feb. 3, 2011

(30) Foreign Application Priority Data

Jul. 31, 2009 (KR) .................. 10-2009-0070349

(51) Int. Cl.
*B60W 10/04* (2006.01)
(52) U.S. Cl.
USPC .................. 477/176; 477/5; 477/70; 477/86
(58) Field of Classification Search
USPC .................. 477/5, 70, 86, 166, 176
See application file for complete search history.

(56) References Cited

U.S. PATENT DOCUMENTS

2007/0278022 A1* 12/2007 Tanishima .................. 477/5

FOREIGN PATENT DOCUMENTS

| JP | 2000-291695 A | 10/2000 |
| JP | 2005-162142 A | 6/2005 |
| JP | 2005-233423 A | 9/2005 |
| JP | 2008-249140 A | 10/2008 |

* cited by examiner

*Primary Examiner* — Derek D Knight
(74) *Attorney, Agent, or Firm* — Edwards Wildman Palmer LLP; Peter F. Corless

(57) ABSTRACT

The present invention provides a method for reducing backlash vibrations in a hybrid electric vehicle, in which the backlash vibrations generated between a motor and a driving wheel can be easily reduced by slipping a clutch in an automatic transmission when the direction of a motor driving torque is changed while the hybrid electric vehicle is running in electric vehicle (EV) mode.

6 Claims, 3 Drawing Sheets

METHOD FOR REDUCING BACKLASH VIBRATIONS IN HYBRID ELECTRIC VEHICLE

CROSS-REFERENCE TO RELATED APPLICATION

This application claims under 35 U.S.C. §119(a) the benefit of Korean Patent Application No. 10-2009-0070349 filed on Jul. 31, 2009, the entire contents of which are incorporated herein by reference.

BACKGROUND (a) Technical Field

The present disclosure relates, generally, to a method for reducing the vibrations in a hybrid electric vehicle. More particularly, the present invention relates to a method for reducing backlash vibrations in a hybrid electric vehicle, in which the backlash vibration that is generated between a motor and a driving wheel can be easily reduced by slipping a clutch in an automatic transmission when the direction of a motor driving torque is suitably changed while the hybrid electric vehicle is running in electric vehicle (EV) mode.

(b) Background

Hybrid electric vehicles are vehicles that use an engine in combination with an electric motor as an auxiliary source of power to be able to promote a decrease in exhaust gas and an increase in fuel efficiency. In the power train system of a parallel hybrid electric vehicle, for example as shown in FIG. 3, an engine 10, an electric motor 20, and an automatic transmission 30 are directly connected with each other on an axis, and a clutch 40 is suitably arranged between the engine 10 and the electric motor 20. Further, in order to drive these components, an integrated starter generator 70 is directly connected with a crank pulley of the engine through a belt, and a rechargeable high-voltage battery 50 is suitably connected with the electric motor 20 through an inverter 60.

Preferably, in this hybrid electric vehicle, electric vehicle (EV) driving mode, i.e. EV only mode, suitably transmits only power of the electric motor 20 to a driving wheel 80 through the automatic transmission 30. For example, after being started, the hybrid electric vehicle is suitably driven by the electric motor.

Further, when the clutch 40 arranged between the engine 10 and the electric motor 20 is suitably activated to transmit power of the engine 10 to the driving axle, the hybrid electric vehicle (HEV) driving mode uses both the power of the engine 10 and the power of the electric motor 20, and more particularly uses the power of the engine 10 as main power and the power of the electric motor 20 as auxiliary power in the event of medium-speed traveling or high-speed traveling.

Further, driving modes of the hybrid electric vehicle include the regenerative braking mode in which the electric motor 20 is suitably generated to charge inertial energy of the vehicle to the battery during deceleration.

Preferably, since the engine power can be switched by the clutch, the electric motor 20 is suitably generated to recover the inertial energy so as to charge the battery 50 when no battery charging limitation is imposed (i.e., when the clutch is not coupled).

In this hybrid electric vehicle, the automatic transmission 30 is suitably arranged between the electric motor 20 and the driving wheel 80, and a final reduction gear (not shown) is suitably connected with the automatic transmission 30, etc. and includes gear elements having a backlash characteristic, but is short of a damping element such as a torsional damper.

As a result, vibrations are caused by backlash when the direction of an effective transfer torque is changed.

This vibration phenomenon is mainly caused in the event of a creep start by backlash accumulation of the gear elements between the electric motor and the driving wheel. The vibration phenomenon creates a contrast with a desired image of consumers who may view the hybrid electric vehicle as a next-generation eco-friendly vehicle, and as a result the net drivability of the vehicle may be affected.

Thus, a preferred method of reducing the vibrations caused by the backlash includes, for example, a passive damping method of separately mounting a physical damping element such as a physical torsional damper, an active damping method of actuating damping force in the opposite direction of the vibrations on the basis of closed loop control, a torque profiling method of deforming the input torque of a backlash mechanism to inhibit generation of the vibration, and so on.

In the passive damping method, since a separate damper is additionally mounted on a power train system, there is a packing problem that results from the addition of the damper, and there is also an increased cost. In the case of the active damping method, design of a high-performance sensor and observer is essentially required, and performance is reduced in a specified situation where vibrations having causes other than the backlash, as in an uneven road, occur.

Further, in the case of the torque profiling method, since various types of torque deformation are taken into consideration, it is possible to apply control of suitably reducing the rate of torque variation in the neighborhood of a position where the backlash occurs. However, it is difficult to secure perfect vibration reduction performance in the process where torque response performance is traded off against vibration reduction performance.

Accordingly, there remains a need in the art for an additional vibration-reducing plan to apply both the active damping method and the torque profiling method, to make up for vibration reduction performance of the two methods, and to suitably cause no interference because similar vibration-reducing plans interfere with each other.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention is directed to a method for suitably reducing backlash vibrations from a hybrid electric vehicle, in which the backlash vibrations generated from gear elements between a motor and a driving wheel can be easily reduced by forcibly slipping a clutch in an automatic transmission when the direction of a motor driving torque is changed while the hybrid electric vehicle is running in electric vehicle (EV) mode.

In a preferred aspect, the present invention provides a method of reducing backlash vibrations in a hybrid electric vehicle. In preferred embodiments, the method includes suitably reducing the backlash vibrations through clutch slip control of forcibly slipping a clutch element in an automatic transmission between an electric motor and a driving wheel when direction of a motor torque is suitably changed in a process where the hybrid electric vehicle is running in electric vehicle (EV) driving mode.

In a preferred embodiment, the clutch slip control may include, but also may not be limited only to, sending a hydraulic pressure instruction to a shifting clutch in the automatic transmission when the motor torque direction is suitably changed to reduce a clutch control hydraulic pressure; slipping the clutch in the automatic transmission by suitably reducing the clutch control hydraulic pressure; and locking up the clutch when a slip amount of the clutch in the automatic transmission reaches a predetermined value.

In another preferred embodiment, the hydraulic pressure instruction may be suitably configured to have a value meeting a condition that a present motor torque is suitably greater than the torque capacity of the shifting clutch.

In still another preferred embodiment, on locking up the clutch, a predetermined hydraulic profile may be suitably applied to the clutch in order to prevent a coupling shock.

In certain preferred embodiments, the present invention provides the following effects.

Preferably, the vibrations caused by the backlash can be easily reduced through control that suitably slips the clutch in the automatic transmission when the direction of the motor driving torque is changed while the hybrid electric vehicle is running in electric vehicle (EV) mode.

In further preferred embodiments, the clutch in the automatic transmission is induced to slip without adding a separate hardware unit, so that costs can preferably be reduced.

In addition, according to other preferred embodiments of the present invention, when existing other vibration-reducing methods (e.g. an active damping method and a torque profiling method) are applied together, the effect of reducing the vibrations caused by the backlash can be further increased.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid electric vehicles, electric vehicles, plug-in hybrid electric vehicles, hydrogen-powered vehicles and other alternative fuel vehicles (e.g. fuels derived from resources other than petroleum). As referred to herein, a hybrid electric vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
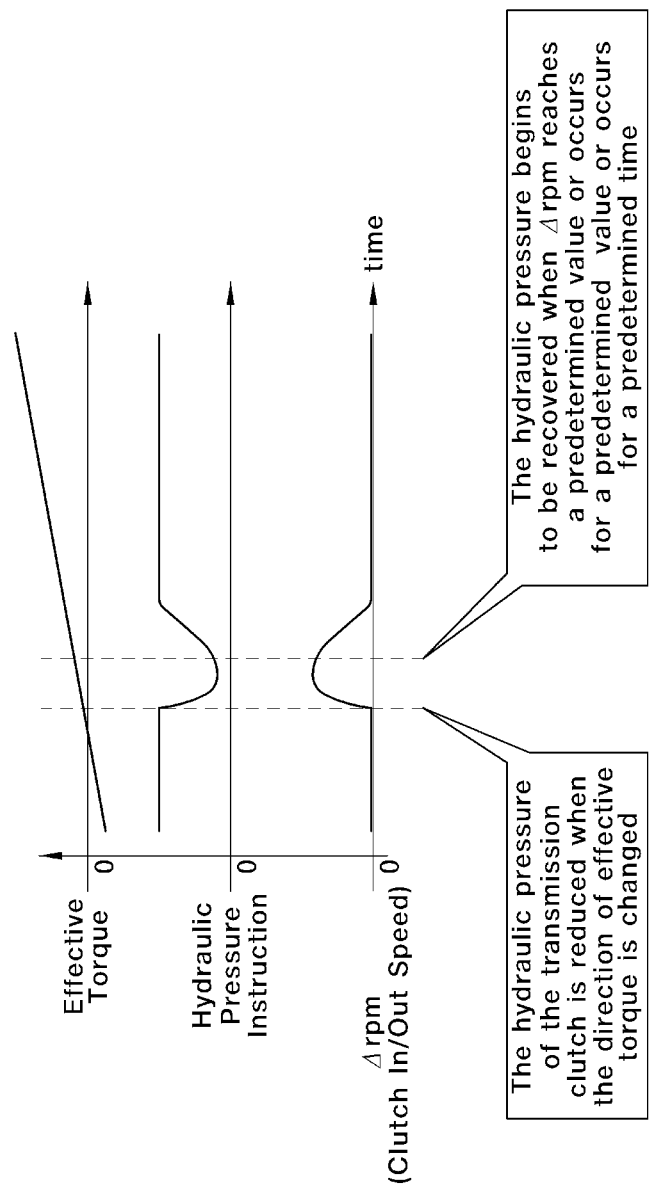
FIG. 1 is a control sequence diagram for a method of reducing backlash vibrations from a hybrid electric vehicle according to an exemplary embodiment of the present invention.
Figure 2:
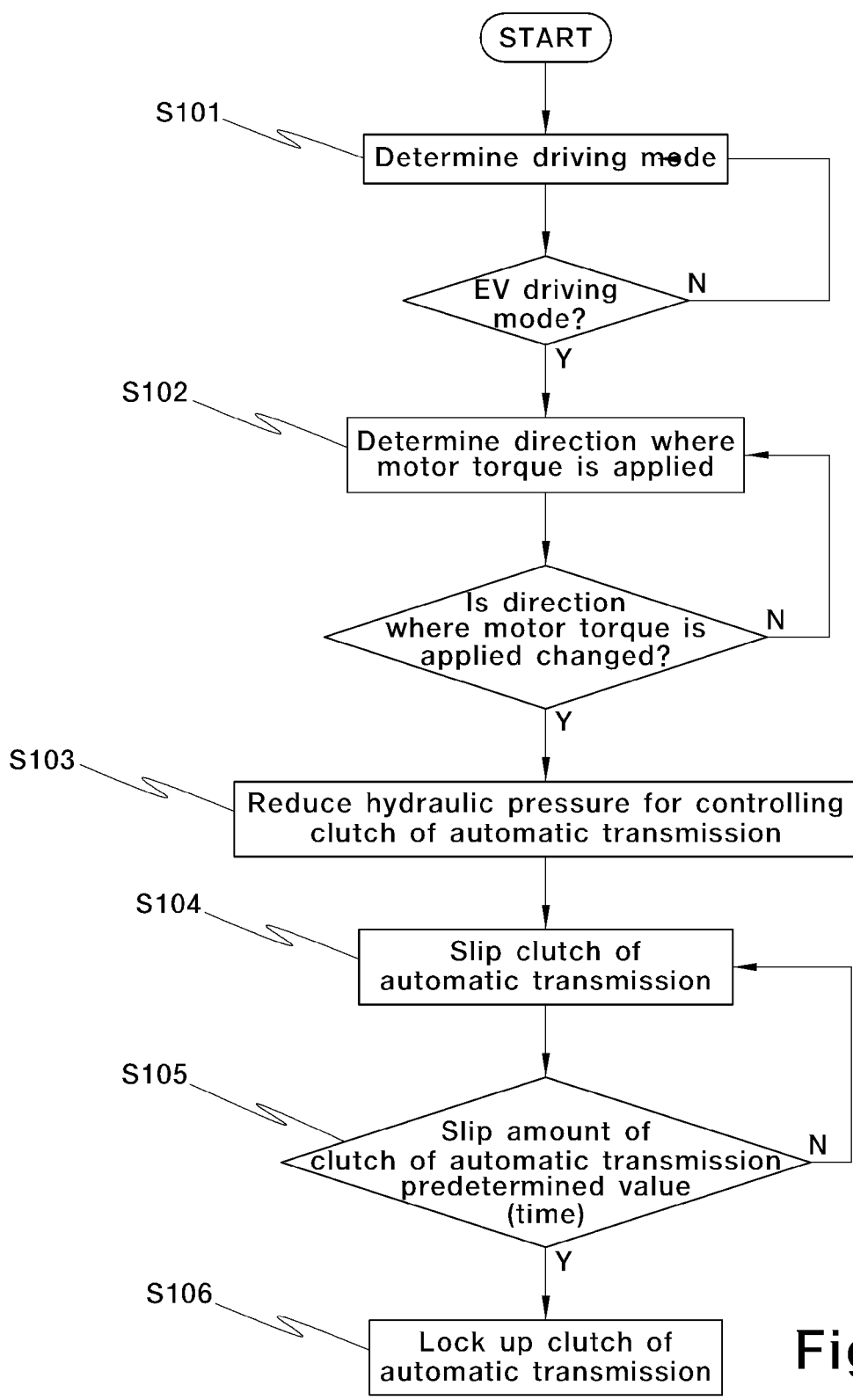
FIG. 2 is a flowchart explaining a method of reducing backlash vibrations from a hybrid electric vehicle according to another exemplary embodiment of the present invention.
Figure 3:
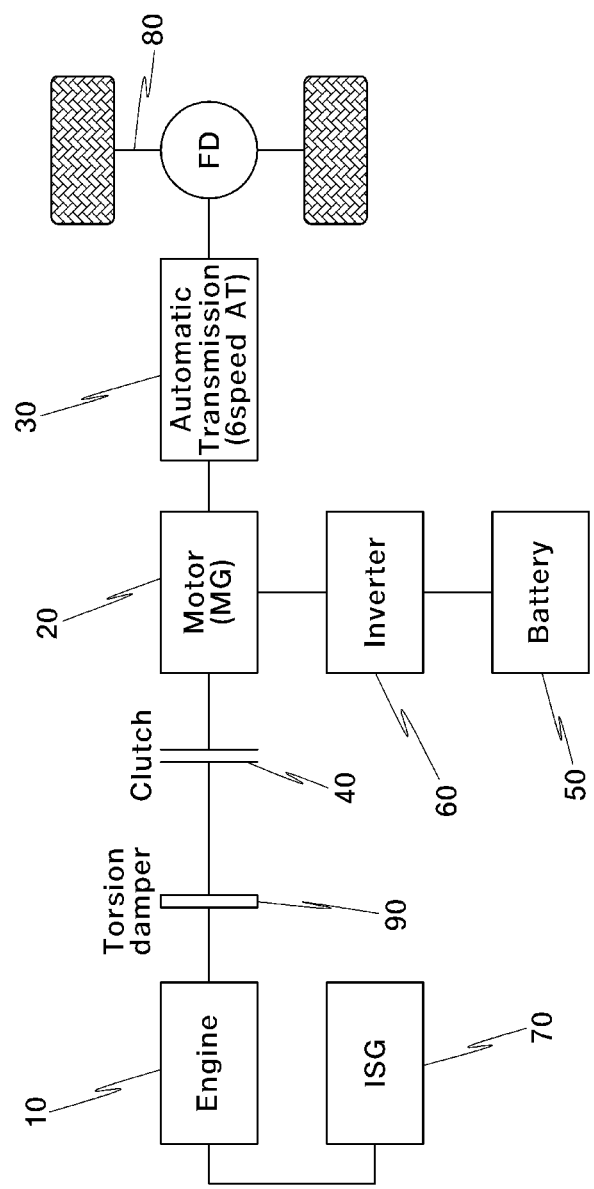
FIG. 3 illustrates an exemplary configuration of a power train system in a hybrid electric vehicle.

Reference numerals set forth in the Drawings includes reference to the following elements as further discussed below:

| | |
|---|---|
| 10: | engine |
| 20: | electric motor |
| 30: | automatic transmission |
| 40: | clutch |
| 50: | battery |
| 60: | inverter |
| 70: | ISG |
| 80: | driving wheel |
| 90: | torsional damper |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

As described herein, the present invention includes a method of reducing backlash vibrations in a hybrid electric vehicle, the method comprising forcibly slipping a clutch element in an automatic transmission between an electric motor and a driving wheel when the direction of a motor torque is changed.

In one embodiment, the hybrid electric vehicle is running in an electric vehicle (EV) driving mode.

In another embodiment, the clutch slip control further includes sending a hydraulic pressure instruction to a shifting clutch in the automatic transmission when the motor torque direction is changed to reduce a clutch control hydraulic pressure.

In a further embodiment, the clutch slip control further includes slipping the clutch in the automatic transmission by reducing the clutch control hydraulic pressure.

In another further embodiment, the clutch slip control further includes locking up the clutch when a slip amount of the clutch in the automatic transmission reaches a predetermined value.

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

As described herein, as for the power train system of a hybrid electric vehicle to which a vibration-reducing method of the present invention can be applied, an engine 10, an electric motor 20, and an automatic transmission 30 are directly connected with each other on an axis, and an engine clutch 40 for changing to electric vehicle (EV) driving mode or hybrid electric vehicle (HEV) driving mode is suitably arranged between the engine 10 and the electric motor 20. In further preferred embodiments, the automatic transmission 30 and a final reduction gear (not shown) are suitably located between the electric motor 20 and a driving wheel 80. In particular preferred embodiments, a torsional damper 90 is suitably disposed between the engine 10 and the clutch 40.

Preferably, when the direction of a driving torque of the electric motor is changed, a backlash phenomenon may be suitably generated from gear elements in the 6-speed automatic transmission 30 that is suitably disposed between the electric motor 20 and the driving wheel 80, so that vibrations can occur.

Accordingly, in HEV driving mode where the engine clutch 40 is suitably coupled to use both power of the engine and power of the electric motor, torsional vibration is absorbed by the torsional damper connected to the side of the engine 10.

Preferably, according to other further embodiments, in EV driving mode where the engine clutch 40 is suitably decoupled to use the power of the electric motor only, vibration is caused by the backlash because no damping element is separately installed on the automatic transmission and final reduction gear disposed between the electric motor 20 and the driving wheel 80.

In further preferred embodiments, when the direction of the driving torque of the electric motor is changed, the backlash is suitably generated from the gear elements in the automatic transmission 30 and the final reduction gear disposed between the electric motor 20 and the driving wheel 80, and simultaneously the vibration is caused by the backlash.

Accordingly, the present invention is directed to forcibly slipping a clutch element in the automatic transmission to perform a damper function that suitably reduces the vibrations caused by the backlash when the direction of the driving torque of the electric motor is changed in the process where the hybrid electric vehicle is running in EV driving mode.

A method of reducing backlash vibrations in a hybrid electric vehicle according to an embodiment of the present invention is described in detail herein In one exemplary embodiment, it is first determined in which driving mode the hybrid electric vehicle is running (S101). Preferably, if the hybrid electric vehicle is running in EV driving mode based on the electric motor, it is determined whether the direction of an effective input torque of the electric motor has suitably changed (S102).

Preferably, it is further determined whether the direction of the effective input torque of the electric motor 20, i.e. the direction of the driving torque subtracting various frictional forces applied to the electric motor from motor torque has suitably changed, and then its detection signal is sent to a controller (e.g., a hybrid control unit (HCU) or a motor control unit (MCU) that is a top-level controller of the hybrid electric vehicle).

According to further preferred embodiments, the fact that the direction of the driving torque of the electric motor 20 has changed means, for instance, the case where the driving torque of the electric motor is changed in a negative (−) direction when a driver steps on an accelerator pedal to apply the driving torque of the electric motor in a positive (+) direction and then releases the accelerator pedal.

According to a further preferred embodiment, when it is determined that the direction of the effective input torque of the electric motor 20 has suitably changed, the controller sends a hydraulic pressure instruction to a shifting clutch (not shown) that is suitably coupled or decoupled in the automatic transmission 30 by hydraulic pressure. Preferably, clutch control hydraulic pressure in the automatic transmission is suitably reduced such that a value of the hydraulic pressure instruction meets a condition that a present motor torque is greater than torque capacity of the shifting clutch (S103).

Accordingly, the clutch controlling hydraulic pressure in the automatic transmission 30 is suitably reduced, and simultaneously the clutch slips (S104). Due to this slip of the clutch, the backlash vibrations generated from the gear elements in the automatic transmission 30, the final reduction gear, etc. are reduced.

As described herein, the clutch element in the automatic transmission 30 is induced to slip by a predetermined value or for a predetermined time so as to suitably perform a damper function for reducing the vibrations. Accordingly, it is possible to suitably reduce the backlash vibrations generated by a change in direction where the motor torque is suitably applied.

Preferably, clutch friction occurring when the clutch for the automatic transmission slips suitably applies a load in a speed direction caused by the backlash vibrations, thereby performing a kind of damper function. Accordingly, the backlash vibration can be suitably reduced.

In another exemplary embodiment, it is determined whether a slip amount applied to the clutch in the automatic transmission 30 reaches a predetermined value or occurs for a predetermined time (S105). Preferably, if the slip amount reaches the predetermined value or occurs for the predetermined time, the clutch is locked up such that the motor power is suitably transmitted to the driving wheel without a slip.

When the clutch is locked up, a predetermined hydraulic profile is suitably applied to the clutch such that no coupling shock occurs (S106).

In further preferred embodiments, when the slip amount, i.e. $\Delta$rpm, of the clutch in the automatic transmission suitably increases, durability of the surrounding components including the clutch in the automatic transmission may be reduced. Accordingly, the slip amount (that is capable of dealing with the backlash and preventing the reduction of the durability) may be suitably applied for a predetermined value or for a predetermined time.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method of reducing backlash vibrations in a hybrid electric vehicle, the method comprising reducing the backlash vibrations through clutch slip control of forcibly slipping a clutch element in an automatic transmission between an electric motor and a driving wheel when direction of a motor torque is changed in a process where the hybrid electric vehicle is running in an electric vehicle (EV) driving mode, wherein the clutch slip control includes:
sending a hydraulic pressure instruction to a shifting clutch in the automatic transmission when the motor torque direction is changed to reduce a clutch control hydraulic pressure;
slipping the clutch in the automatic transmission by reducing the clutch control hydraulic pressure; and
locking up the clutch when a slip amount of the clutch in the automatic transmission reaches a predetermined value.

2. The method of claim 1, wherein the hydraulic pressure instruction is configured to have a value meeting a condition that a present motor torque is greater than a torque capacity of the shifting clutch.

3. The method of claim 1, wherein on locking up the clutch, a predetermined hydraulic profile is applied to the clutch in order to prevent a coupling shock.

4. A method of reducing backlash vibrations in a hybrid electric vehicle, the method comprising forcibly slipping a clutch element in an automatic transmission between an electric motor via a clutch slip control and a driving wheel when the direction of a motor torque is changed,
   wherein the clutch slip control includes:
      sending a hydraulic pressure instruction to a shifting clutch in the automatic transmission when the motor torque direction is changed to reduce a clutch control hydraulic pressure;
      slipping the clutch in the automatic transmission by reducing the clutch control hydraulic pressure; and
      locking up the clutch when a slip amount of the clutch in the automatic transmission reaches a predetermined value.

5. The method of claim 4, wherein the hybrid electric vehicle is running in an electric vehicle (EV) driving mode.

6. The method of claim 4, wherein the clutch slip control further includes sending a hydraulic pressure instruction to the shifting clutch in the automatic transmission when the motor torque direction is changed to reduce a clutch control hydraulic pressure.

\* \* \* \* \*